(12) United States Patent
Gelso et al.

(10) Patent No.: US 11,655,746 B2
(45) Date of Patent: May 23, 2023

(54) METHOD FOR DETECTING A SENSOR ANOMALITY

(71) Applicant: VOLVO TRUCK CORPORATION, Gothenburg (SE)

(72) Inventors: Esteban Gelso, Gothenburg (SE); Johan Engbom, Västra Frölunda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/659,105

(22) Filed: Apr. 13, 2022

(65) Prior Publication Data

US 2022/0341354 A1    Oct. 27, 2022

(30) Foreign Application Priority Data

Apr. 22, 2021    (EP) .................................. EP21169772

(51) Int. Cl.
*F01N 11/00*    (2006.01)

(52) U.S. Cl.
CPC ........ *F01N 11/00* (2013.01); *F01N 2560/026* (2013.01); *F01N 2900/0416* (2013.01); *F01N 2900/1616* (2013.01)

(58) Field of Classification Search
CPC . F01N 11/00; F01N 2560/026; F01N 2560/14
See application file for complete search history.

(56) References Cited

U.S. PATENT DOCUMENTS

| | | | |
|---|---|---|---|
| 2009/0173140 A1* | 7/2009 | Sumitani | G01N 33/0037 73/23.31 |
| 2010/0024520 A1* | 2/2010 | Sawada | F02D 41/1461 73/23.31 |
| 2011/0185707 A1 | 8/2011 | Upadhyay et al. | |
| 2011/0203259 A1 | 8/2011 | Upadhyay et al. | |
| 2011/0252767 A1 | 10/2011 | Lin et al. | |

FOREIGN PATENT DOCUMENTS

| | | | |
|---|---|---|---|
| EP | 1515032 A2 | | 3/2005 |
| EP | 1515032 A3 | | 7/2005 |
| JP | 2003120399 A | * | 4/2003 |
| WO | 2011126429 A1 | | 10/2011 |
| WO | 2018013039 A1 | | 1/2018 |

OTHER PUBLICATIONS

Machine translation of JP-2003120399-A, accessed Nov. 2, 2022. (Year: 2022).*
European Search Report dated Sep. 22, 2021 in corresponding European Patent Application No. 21169772.7, 6 pages.

* cited by examiner

*Primary Examiner* — Jonathan R Matthias
(74) *Attorney, Agent, or Firm* — Venable LLP; Jeffri A Kaminski

(57) ABSTRACT

A computer implemented method for anomaly detection at a first nitrogen oxide (NOx) sensor forming part of an exhaust gas aftertreatment system (EATS) is provided. The EATS is coupled downstream of an internal combustion engine (ICE). The disclosed methodology applies manipulation of the ICE for detecting such a possible anomaly.

13 Claims, 5 Drawing Sheets

METHOD FOR DETECTING A SENSOR ANOMALITY

TECHNICAL FIELD

The present disclosure generally relates to a computer implemented method for anomality detection at a first nitrogen oxide (NOx) sensor forming part of an exhaust gas aftertreatment system (EATS), wherein the EATS is coupled downstream of an internal combustion engine (ICE). The disclosed methodology applies manipulation of the ICE for detecting such a possible anomaly. The present disclosure also relates to a corresponding engine system and a computer program product.

BACKGROUND

There is an ongoing development for reducing emissions in a vehicle, such as a truck, for example comprising a diesel-based combustion engine. Such a diesel engine has an efficiency of up to about 52% and is thus the best converter of fossil energy. The high efficiency is however only possible at an elevated combustion temperature at which high levels of oxides of nitrogen (NOx) are inevitable, generally in combination with particulate matter (PM), in exhaust gases from the diesel engine.

Reducing (NOx) and particulate matter (PM) in the exhaust gases has become very important in view of the protection of environment and the saving of finite fossil energy supply. Also, current legal emission requirements generally dictate emission control, whereby exhaust gas aftertreatment systems (EATS) are necessary. Usually, such an EATS comprises a Selective Catalytic Reduction (SCR) for oxidizing nitrogen monoxide (NO) to nitrogen dioxide (NO2), a particulate filter and a unit for reducing NOx emissions. The EATS functions as soon as exhaust gas temperatures are above around 200°-250° deg. C. However, ensuring that the EATS functions in an optimal manner is complicated and it is problematic to ensure that only a minimal level of NOx is released into the environment.

First of all, to be able to allow the EATS to operate in an environmentally optimal manner it is necessary for NOx sensors used with the EATS to function properly. Failure of such sensors, e.g. due to problems/end of life, will greatly influence the function of the EATS. An exemplary implementation of investigating the reliability of measurements from NOx sensors is presented in US20110252767. US20110252767 applies a diagnosis scheme where, during an aftertreatment component regeneration event, urea dosage is selectively halted. Frequency data from the NOx sensors are the compared for the time periods where urea is injected, and the injection of urea is halted.

Even though US20110252767 improves the overall ability to diagnose how well the NOx sensor are behaving, there appears to be room for further improvements, specifically taking into account the ability to perform such diagnosis also outside of scheduled aftertreatment component regeneration events.

SUMMARY

In accordance with an aspect of the present disclosure, the above is at least partly alleviated by means of a computer implemented method for anomality detection at a first nitrogen oxide (NOx) sensor comprised with an exhaust gas aftertreatment system (EATS) coupled downstream of an internal combustion engine (ICE), the ICE comprising a control unit adapted to control an operation of the ICE and arranged in communication with the first NOx sensor, wherein the method comprises the steps of selecting, at the control unit, a first set of control parameters to operate the ICE to generate a first output, forming, at the control unit, a second set of control parameters to operate the ICE by manipulating the first set of control parameters with an adjustment signal having a predefined waveform, the adjustment signal adapted to vary an amount of NOx produced by the engine, operating, using the control unit, the ICE according to the second set of control parameters, receiving, at the control unit, measurement data from the first NOx sensor collected over a first predefined time period, determining, using the control unit, a first level of matching between the predefined waveform of the adjustment signal and the measurement data from the first NOx sensor, and indicating, using the control unit, the presence of an anomaly at the first NOx sensor if the first level of matching is below a first predefined threshold.

The present disclosure is based around the desire to allow for an independent diagnosis of a NOx sensor, where the NOx sensor forms part of an exhaust gas aftertreatment system (EATS), i.e. without having to rely on a comparison between measurements from multiple NOx sensors. Furthermore, the present inventors have identified the need to allow such a diagnosis to be achieved during normal use/operation of the ICE, i.e. not necessarily limited to when the EATS perform an aftertreatment component regeneration event. This is in line with the present disclosure achieved by inducing an adjustment signal onto general control parameters for controlling the ICE, where the adjustment signal is provided for varying how the ICE is producing NOx. The adjustment signal is however not randomly selected, but rather follows a predefined shape or waveform. Taking this known predefined shape or waveform into account, it will then by means of the present disclosure be possible to see if "real" measurements from the NOx sensor is matching the predefined shape/waveform.

The matching between the real measurements from the NOx sensor and the predefined shape/waveform will then be investigated to see how well they fit, and in case the fit is at a desired level (above a predefined threshold), the NOx sensor is considered to be operating in a correct manner. Conversely, in case there is an in comparison undesirable matching between the real measurements from the NOx sensor and the predefined shape/waveform, then the NOx sensor is considered to be incorrect and an anomaly is considered to be present.

It should be understood that the expression "first NOx sensor" relates to any NOx sensor comprised with the EATS, when taken separately. Accordingly, the diagnosis scheme according to the present disclosure may thus be separately applied to each of the possibly plurality of NOx sensors forming part of the EATS. That is, further sensors that just the first NOx sensor may form part of the EATS, such as a second sensor, as will be discussed further below.

It could within the scope of the present disclosure be possible to determine an accumulated first level of matching for the first predefined time period, possibly by determining a difference between the real measurements from the NOx sensor and the predefined shape/waveform for a plurality of number of times during the first predefined time period (sampling). The differences may then be accumulated for determining a "combined" first level of matching. Alternatively, it could be possible to identify a maximum difference between the real measurements from the NOx sensor and the predefined shape/waveform and use such a value as to define the first level of matching (to later be used in comparison with the first predefined threshold). The first predefined threshold could in turn be selected based on the matching scheme used for comparing the real measurements from the NOx sensor and the predefined shape/waveform. In some embodiments the first predefined threshold is normalized/filtered to a 5-25% and preferably 10% difference between the real measurements from the NOx sensor and the predefined shape/waveform.

Advantages following by means of the present disclosure thus include a discrete way of investigating if the NOx sensor is behaving correctly or incorrectly, without having to force the ICE/EATS into the mentioned aftertreatment component regeneration event, possibly being highly undesirable and unwanted in some situations (possible soot generation). In comparison, the diagnosis scheme according to the present disclosure may be performed without the need to increase a temperature of the EATS, meaning that the NOx sensor diagnosis may be performed completely "in the background". Accordingly, an intensity/amplitude of the predefined shape/waveform may be selected in such a way that the overall diagnosis process can go essentially unnoticed for e.g. an operator of the ICE. That said, if needed, such an intensity/amplitude may be selected to ensure that the amount of NOx produced by the engine is varied "enough", in some embodiments at least 2%-5%, and possibly up to 15%. Furthermore, a duration of the first predefined time period could in some embodiments be selected based on the intensity/amplitude of the predefined shape/waveform. In one embodiment the first predefined time period is at least 0.5 seconds and preferably at least 2 minutes. It should furthermore be understood that the predefined shape/waveform in some embodiments also could be asymmetrically shaped.

The control unit used for controlling the operation of the present diagnosis scheme may in one embodiment be an electronic control unit (ECU), also used at least in part for controlling functions in relation to the ICE. However, at least one portion of the functionality of the control unit may in some alternative embodiments be performed using a remote server such as a cloud server, where the cloud server being network connected to an/the electronic control unit (ECU) provided in conjunction with the ICE. As such, it could be possible to allow the predefined shape/waveform to be downloaded to the ECU, e.g. depending on the type of EATS/ICE combination. The predefined shape/waveform could also potentially be changed over time, for example dependent on results from corresponding diagnosis process performed in relation to other ICE/EATS combinations. Accordingly, the result of the diagnosis process performed at the "own" ICE/EATS combination may be shared with other ICE/EATS combinations. It could also be possible to selectively activate the present diagnosis scheme depending on an operating condition of the ICE/EATS combination. For example, it could in some situations be undesirable to activate the present diagnosis scheme, such as for example where inherently high NOx emissions in combination with the adjustment signal would push the resulting NOx emissions outside of a legal limit. Similarly, it could be undesirable to activate the present diagnosis scheme in case of an intermediately poor SCR conversion efficiency or if the ICE is operating in a point close to the saturation limits (max or min) of NOx.

In line with the present disclosure it could be possible to allow the predefined waveform to be sinusoidally or rectangularly shaped, or to include any form of periodic waveform. Such shapes may generally be easily formed and detected by the control unit. However, other shapes are of course possible and within the scope of the present disclosure, e.g. including trapezoid shaped waveforms or a stepwise changing waveform. It is preferred if the waveform oscillates a plurality of times within the first predefined time period, meaning that the waveform is repeated at least two times within the first predefined time period. It could however also be possible to introduce a waveform that has a frequency where e.g. only one single period is "fitted" within the first predefined time period. Consequently, the first predefined time period could in some embodiments be selected based on the selected type of predefined waveform.

In an embodiment of the present disclosure the EATS comprises a selective catalytic reduction (SCR) arrangement, the first sensor is arranged upstream of the SCR arrangement, the EATS further comprises a second NOx sensor arranged downstream of the SCR arrangement, and the method further comprise the steps of receiving, at the control unit, measurement data from the second NOx sensor collected over the first predefined time period, determining, using the control unit, a second level of matching between the measurement data from the first NOx sensor or the predefined waveform of the adjustment signal and the measurement data from the second NOx sensor, and indicating, using the control unit, the presence of an anomaly at the second NOx sensor if the second level of matching is below a second predefined threshold. Accordingly, also a second NOx sensor may in accordance to the present disclosure be diagnosed for determining if an anomaly is present. Also in this embodiment the second level of matching may be determined in a similar manner as discussed above in relation to the first level of matching.

To optimize the anomaly determination process it may be preferred to only perform the determination of the second level of matching if the first level of matching is above the first predefined threshold. Accordingly, the second NOx sensor is only diagnosed for anomaly in case the first NOx sensor is determined to be operating correctly.

Preferably, the diagnosis scheme according to the present disclosure further comprises indicating, using the control unit, the presence of an ammonia (NH3) slip if the measurement data from the second NOx sensor is phase shifted as compared to the measurement data from the first NOx sensor. That is, if the measurement data from the second NOx sensor is inversed (waveform) as compared to measurement data from the first NOx sensor, then there is likely an ammonia (NH3) slip at the SCR catalyst. Further investigations may then be needed to counteract the ammonia (NH3) slip.

In one embodiment, it may be possible to select the adjustment signal to manipulate at least one of an EGR valve, a waste gate valve position, an intake throttle valve position, a fuel injection pressure, a fuel injection timing, a variable geometry turbine (VGT) position and an ignition timing. Each of the listed ways of manipulating the EATS/ICE combination are fairly easy to implement, and can be used separately or in combination for achieving the desired "waveform fluctuation" of the generated NOx, to then be measured by the first and possibly second NOx sensor in the manner as discussed above.

According to another aspect of the present disclosure, there is provided an engine system, comprising an internal combustion engine (ICE), an exhaust gas aftertreatment system (EATS) coupled downstream of the ICE, a first nitrogen oxide (NOx) sensor, and a control unit, wherein the control unit is arranged to select a first set of control parameters to operate the ICE to generate a first output, form a second set of control parameters to operate the ICE by manipulating the first set of control parameters with an adjustment signal having a predefined waveform, the adjustment signal adapted to vary an amount of NOx produced by the engine, operate the ICE according to the second set of control parameters, receive measurement data from the first NOx sensor collected over a first predefined time period, determine a first level of matching between the predefined waveform of the adjustment signal and the measurement data from the first NOx sensor, and indicate the presence of an anomaly at the first NOx sensor if the first level of matching is below a first predefined threshold. This aspect of the present disclosure provides similar advantages as discussed above in relation to the previous aspect of the present disclosure.

Further effects and features of the present computer implemented method are similar to what has been presented above in relation to the previous aspect of the present disclosure.

Furthermore, the engine system as presented above may in some embodiment be a component of a vehicle, further comprising the above-mentioned ICE/EATS combination. Such a vehicle may in turn for example be at least one of a truck, a buss, a car and a working machine. The urea injection control system is however also useful in other applications where the ICE/EATS combination is used for other purposes than propelling a vehicle. An example of such an implementation is an electric generator comprising an ICE EATS combination. The ICE is in turn generally a diesel-powered engine or a spark-ignition (SI) ICE powered by hydrogen. It should be understood that other applications are possible, such as in relation to any kind of vessel, including for example a marine vessel.

According to an additional aspect of the present disclosure, there is provided a computer program product comprising a non-transitory computer readable medium having stored thereon computer program means for controlling an engine system, the engine system comprising an internal combustion engine (ICE), an exhaust gas aftertreatment system (EATS) coupled downstream of the ICE, a first nitrogen oxide (NOx) sensor, and a control unit, wherein the computer program product comprises code for selecting, at the control unit, a first set of control parameters to operate the ICE to generate a first output, code for forming, at the control unit, a second set of control parameters to operate the ICE by manipulating the first set of control parameters with an adjustment signal having a predefined waveform, the adjustment signal adapted to vary an amount of NOx produced by the engine, code for operating, using the control unit, the ICE according to the second set of control parameters, code for receiving, at the control unit, measurement data from the first NOx sensor collected over a first predefined time period, code for determining, using the control unit, a first level of matching between the predefined waveform of the adjustment signal and the measurement data from the first NOx sensor, and code for indicating, using the control unit, the presence of an anomaly at the first NOx sensor if the first level of matching is below a first predefined threshold. Also this aspect of the present disclosure provides similar advantages as discussed above in relation to the previous aspects of the present disclosure.

Further effects and features of the present computer program product are similar to what has been presented above in relation to the previous aspects of the present disclosure.

A software executed by the server for operation in accordance to the present disclosure may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

DETAILED DESCRIPTION

Figure 1A:
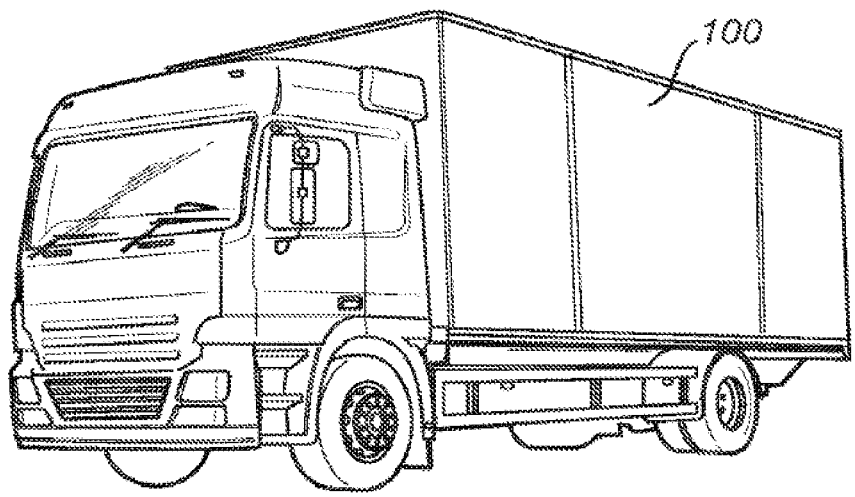
FIGS. 1A illustrates a truck, 1B a bus and 1C a wheel loader in which the engine system according to the present disclosure may be incorporated, FIG. 2 conceptually illustrates a urea injection control system for an internal combustion engine (ICE) according to a currently preferred embodiment of the present disclosure, comprised as a component of propulsion means for e.g. the vehicles as shown in FIG. 1, FIGS. 3A-3E provides illustrative examples of injection of different adjustments signals.

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Figure 1B:
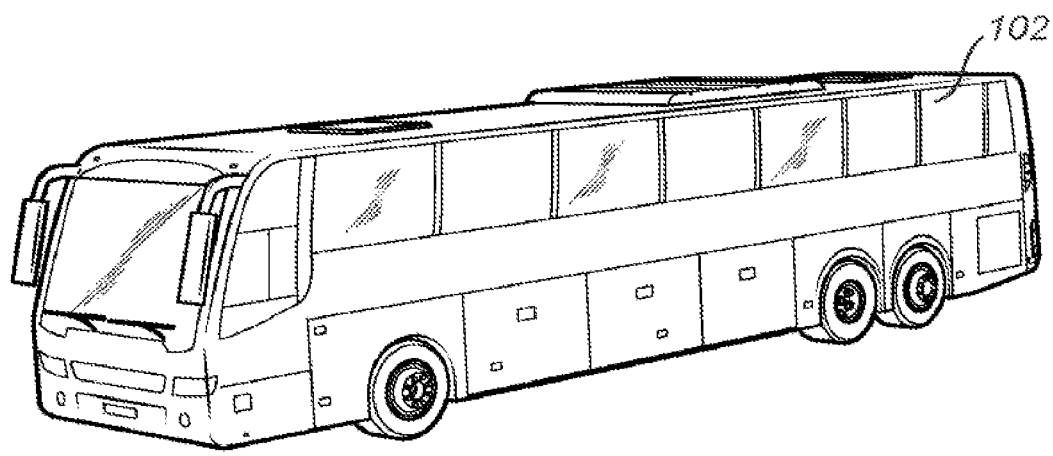
Figure 1C:
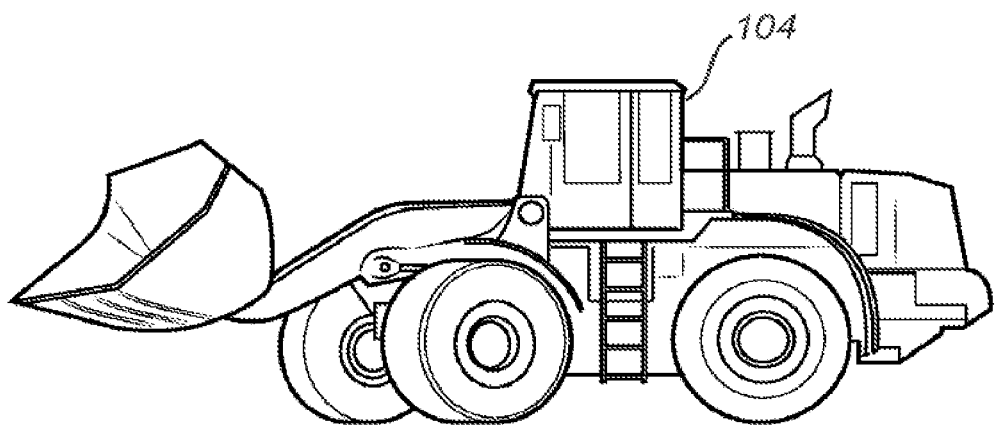
Figure 2:
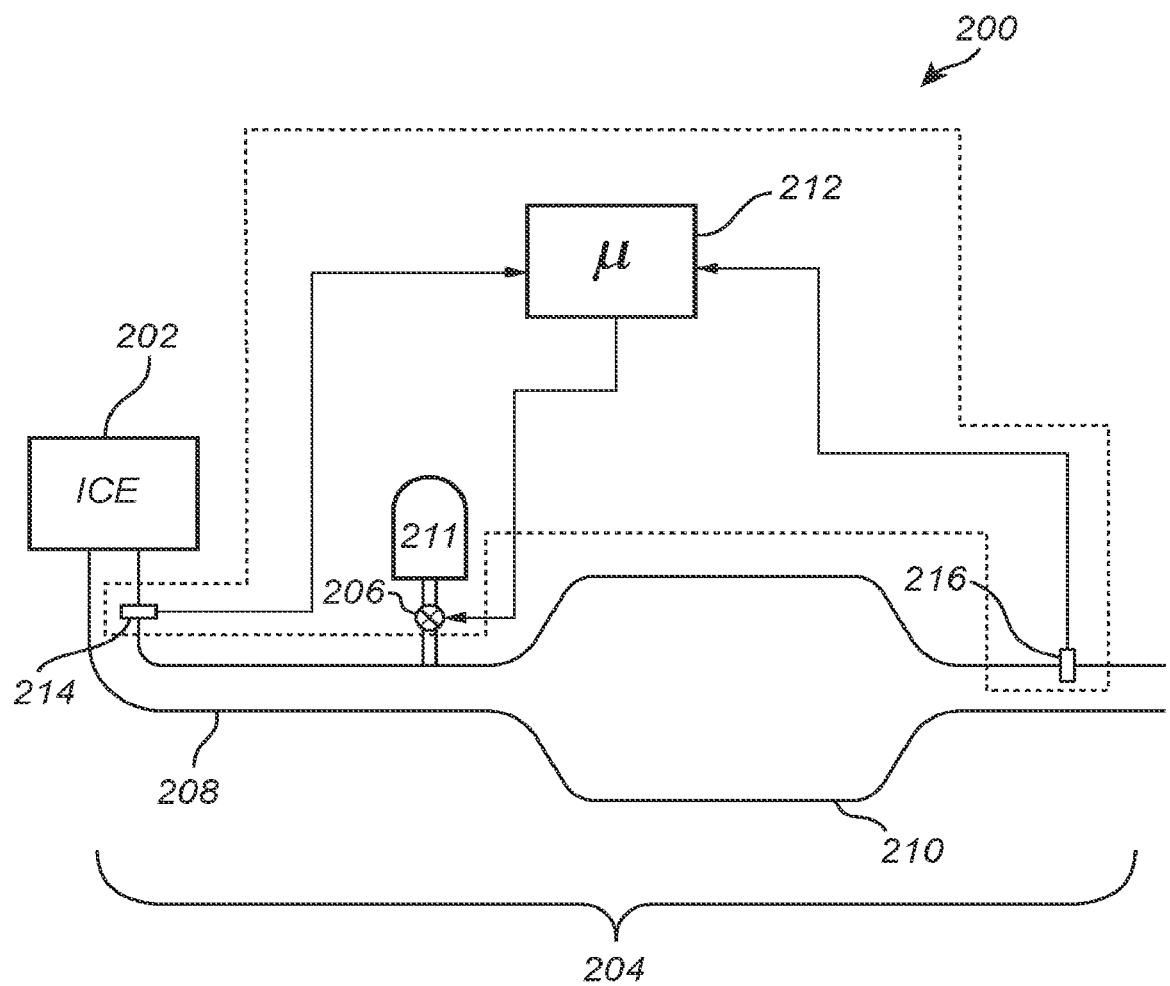

Referring now to the drawings and to FIG. 1 in particular, there is depicted an exemplary vehicle, here illustrated as a truck 100, in which an engine system 200 (as shown in FIG. 2) according to the present disclosure may be incorporated. The engine system 200 may of course be implemented, possibly in a slightly different way, in a bus 102, wheel loader 104, a car, an electric generator, etc.

The vehicle may for example be either a purely combustion-based vehicle (e.g. including a diesel or a spark-ignition (SI) ICE powered by hydrogen) or a hybrid vehicle, the hybrid vehicle comprising both an electrical machine and a combustion engine. The vehicle may further be manually operated, fully or semi-autonomous.

Turning now to FIG. 2, which conceptually illustrates an engine system 200 according to a currently preferred embodiment of the present disclosure. The engine system 200 comprises an internal combustion engine (ICE) 202, where the ICE 202 is provided with an exhaust gas aftertreatment system (EATS) 204 arranged downstream of the ICE 202. In one embodiment, the engine system 200 comprises a urea injector 206 adapted to inject urea into an exhaust line 208 of the ICE 202, the exhaust line 208 being arranged in fluid communication with a selective catalytic reduction (SCR) catalyst 210 of the EATS 204. The SCR catalyst 210 may for example include a base metal/zeolite formulation with optimum NOx conversion performance in the range of 200-500° C.

The engine system 200 further comprises a control unit 212 provided for controlling the urea injector 206. The ICE 202 is generally arranged in communication with an air intake manifold (not shown) and the exhaust line 208. The further components of the ICE 202 are excluded in FIG. 2.

Reductant, such as aqueous urea, is stored in a storage vessel 211 and delivered upstream of the SCR catalyst 210 using the urea injector 206. The reductant is metered out by a pump through a control valve of the urea injector 206, where both the pump and the valve are controlled by the control unit 212. Air and reductant are then injected into the exhaust line 218 in a vaporized state, whereby the vapor is introduced into an exhaust gas mixture when entering the SCR catalyst 210.

The engine system 200 further comprises two separate NOx sensors, where a first NOx sensor 214 is arranged upstream, and second NOx sensor 216 is arranged downstream of the SCR catalyst 210. Both the first and the second NOx sensor 214, 216 are coupled in the path of the exhaust gas from the ICE 202 entering and exiting the SCR catalyst 210, respectively. The outputs of these sensors 214, 216 are acquired by the control unit 212 and used by the control unit 212, for example for controlling the urea injector 206 as well as for determining a NOx conversion efficiency of the SCR catalyst 210.

The EATS 204 preferably also comprises a particulate filter (not shown) arranged downstream of the SCR catalyst 210 and used to trap particulate matter (such as soot) generated during operation of the ICE 202. The particulate filter can be manufactured from a variety of materials including cordierite, silicon carbide, and other high temperature oxide ceramics.

The control unit 212 may for example be an electronic control unit (ECU), comprised with the vehicle 100, 102, 104, possibly manifested as a general-purpose processor, an application specific processor, a circuit containing processing components, a group of distributed processing components, a group of distributed computers configured for processing, a field programmable gate array (FPGA), etc. The control unit 212 may be or include any number of hardware components for conducting data or signal processing or for executing computer code stored in memory. The memory may be one or more devices for storing data and/or computer code for completing or facilitating the various methods described in the present description. The memory may include volatile memory or nonvolatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

Figure 5:
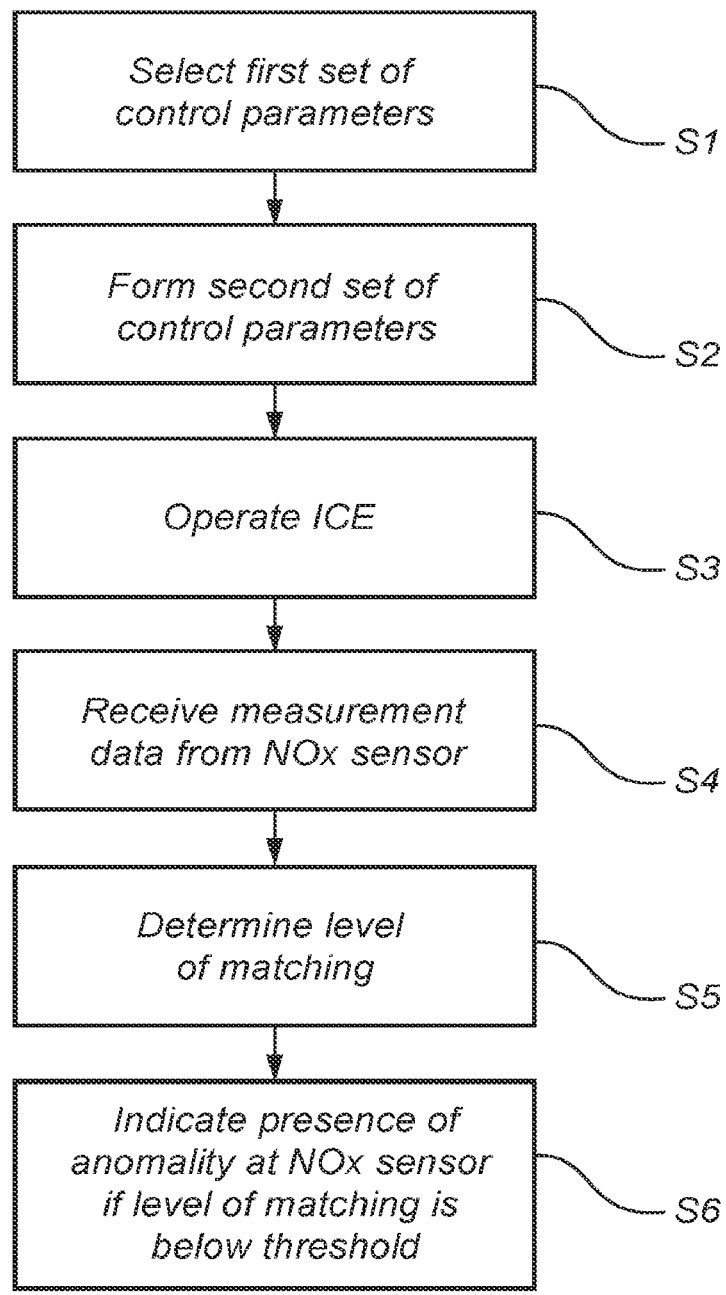
FIG. 5 shows a flow chart of a method according to an embodiment of the present disclosure.

During operation of the engine system 200, with further reference to FIGS. 3 and 5, the diagnosis process according to the present disclosure comprises selecting, S1, a first set of control parameters to operate the ICE 202 to generate a first output. The first output may for example be delivery of an amount of torque for propelling one of the vehicles 100, 102, 104 as shown in FIG. 1, e.g. for generally moving the vehicle 100, 102, 104. The curve 302 as shown in FIG. 3A in turn exemplifies an amount of NOx as generated by the ICE 202 when operated according to the first set of control parameters, i.e. needed to be handled by the EATS 204.

The ICE 202 is however in accordance to the present disclosure not directly operated using the first set of parameters. Rather, a second set of control parameters are formed, S2, by the control unit 212, where instead the second set of parameters intended to be used for operating the ICE 202. The second set of parameters represent a "manipulated version" of the first set of parameters, where the second set of parameters are formed by manipulating the first set of parameters using an adjustment signal having a predefined waveform. A first example of such a waveform 304 is presented in FIG. 3B. The overall adjustment signal is formed with the intention to vary an amount of NOx produced by the ICE 202. The adjustment signal (i.e. represented by the waveform 304) is then combined with the first set of control parameters to form a second set of control parameters to operate the ICE 202.

Figure 3A:
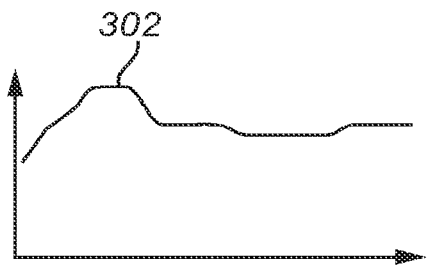

Once the second set of control parameters have been determined, the control unit 212 operates, S3, the ICE 202. The operation of the ICE 202 based on the second control parameters will of course also generate an output. However, since the second control parameters has been "manipulated" with the adjustment signal, the operation based on the second control parameters will be slightly different as compared to the first output. Correspondingly, the amount of NOx as generated by the ICE 202 when operated according to the second set of control parameters will be different as compared to the curve 302 as shown in FIG. 3A. That is, the amount of NOx as generated by the ICE 202 when operated according to the second set of control parameters will be dependent also on the adjustment signal, resulting in a curve 306 as shown in FIG. 3C, representing an amount of NOx as generated by the ICE 202 when operated according to the first set of control parameters. As is visible from FIG. 3C, the curve 306 is influenced by the adjustment signal.

The control unit 212 may accordingly be adapted to receive, S4, measurement data from the first NOx sensor 214 collected over the first predefined time period, such as for a duration of 60 seconds. The control unit 212 will then analyze the measurement data from the first NOx sensor 214 to determine, S5, a first level of matching, where the first level of matching provides an indication of how well the measurement data from the first NOx sensor 214 relates to the adjustment signal. If there is an in comparison good match, then this is in accordance to the present disclosure exemplified by an in comparison high first level of matching. Correspondingly, in case the comparison is "bad", then this is represented by an in comparison low first level of matching.

The control unit 212 may then compare the first level of matching with a predefined threshold. In case the first level of matching is determined to be below the threshold, then the control unit 212 may indicate, S6, that an anomaly is present at the first NOx sensor 214.

Figure 3B:
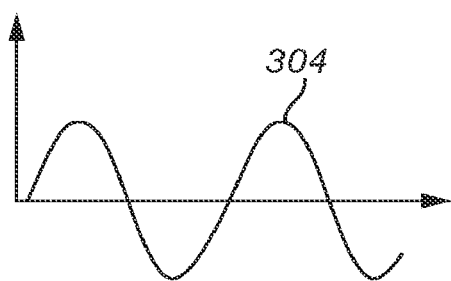
Figure 3D:
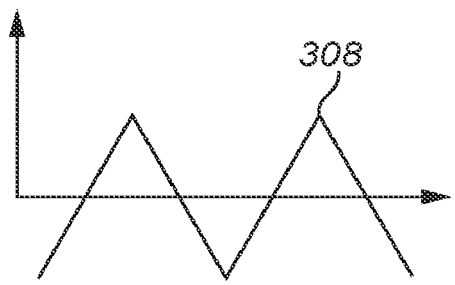
Figure 3C:
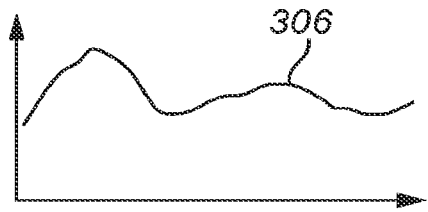
Figure 3E:
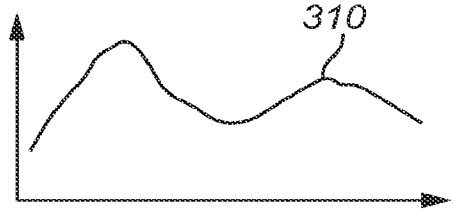

The example provided in FIGS. 3A, 3B and 3C relates to the adjustment signal being a sinusoidally shaped waveform, as specifically shown by the curve 304 in FIG. 3B. However, as discussed above any other predefined waveform shape is possible and within the scope of the present disclosure. For example, and as shown in FIG. 3D the predefined waveform shape could for example be triangularly shaped as exemplified by curve 308. A combination of the curve 302 of FIG. 3A and the adjustment signal 308 will correspondingly generate curve 310 as presented in FIG. 3E.

Figure 4:
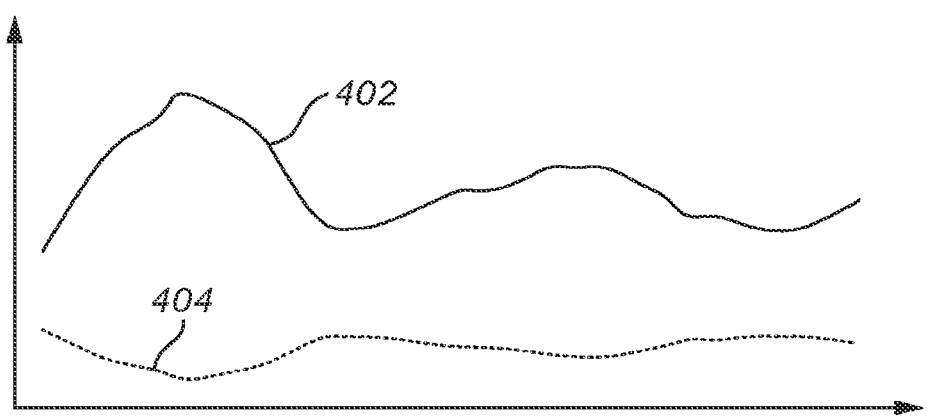
FIG. 4 illustrates an example of an ammonia (NH3) slip detection.

In FIG. 4 it is illustrate an example of ammonia (NH3) slip detection. FIG. 4 shows a curve 402 representing exemplary measurements provided by the first NOx sensor 214 over a predefined time period. FIG. 4 further shows a curve 404 representing measurements provided by the second NOx sensor 216 over the same predefined time period. Generally, the measurements provided by the second NOx sensor 216 indicates that an amount of NOx present in exhaust gases has been reduced when passing through the SCR catalyst 210. However, as is apparent from studying the curves 402 and 404, the curve 404 is in "antiphase" as compared to the curve 402. Such a scenario is an indication of an ammonia (NH3) slip. The control unit 212 may in a corresponding manner provide an indication of an ammonia (NH3) slip in case this scenario is present.

It should be understood that the curves presented in FIGS. 3 and 4 are just provided to exemplify the present disclosure. Accordingly, differences will exist as compared to a "real-world implementation" of the present disclosure.

In summary, the present disclosure relates to a computer implemented method for anomaly detection at a first nitrogen oxide (NOx) sensor comprised with an exhaust gas aftertreatment system (EATS) coupled downstream of an internal combustion engine (ICE), the ICE comprising a control unit adapted to control an operation of the ICE and arranged in communication with the first NOx sensor, wherein the method comprises the steps of selecting, at the control unit, a first set of control parameters to operate the ICE to generate a first output, selecting, at the control unit, an adjustment signal having a predefined waveform, the adjustment signal adapted to vary an amount of NOx produced by the engine, forming, at the control unit, a second set of control parameters to operate the ICE by manipulating the first set of control parameters with the adjustment signal, operating, using the control unit, the ICE according to the second set of control parameters, receiving, at the control unit, measurement data from the first NOx sensor collected over a first predefined time period, determining, using the control unit, a first level of matching between the predefined waveform of the adjustment signal and the measurement data from the first NOx sensor, and indicating, using the control unit, the presence of an anomaly at the first NOx sensor if the first level of matching is below a first predefined threshold.

Advantages following by means of the present disclosure include the possibility to perform an independent diagnosis of a NOx sensor forming part of an exhaust gas aftertreatment system (EATS), without having to rely on a comparison between measurements from multiple NOx sensors.

The above discussion about the urea injection control system according to the present discourse has been made in relation to an implementation where the EATS comprises only a single SCR catalyst. It should however be understood that the presented urea injection control system may be used also in relation to an implementation comprising more than a single SCR catalyst, such as two SCR catalysts. It should also be understood that some implementations may comprise more than just two NOx sensors, for example when the implementation comprises more than a single SCR catalyst.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A computer implemented method for anomaly detection at a first and a second nitrogen oxide (NOx) sensor comprised with an exhaust gas aftertreatment system (EATS), the EATS coupled downstream of an internal combustion engine (ICE) and further comprising a selective catalytic reduction (SCR) arrangement, the ICE comprising a control unit adapted to control an operation of the ICE and arranged in communication with the first and the second NOx sensor, the first NOx sensor is arranged upstream of the SCR arrangement and the second NOx sensor is arranged downstream of the SCR arrangement, wherein the method comprises:

selecting, at the control unit, a first set of control parameters to operate the ICE to generate a first output, forming, at the control unit, a second set of control parameters to operate the ICE by manipulating the first set of control parameters with an adjustment signal having a predefined waveform, the adjustment signal adapted to vary an amount of NOx produced by the engine, operating, using the control unit, the ICE according to the second set of control parameters, receiving, at the control unit, measurement data from the first NOx sensor collected over a first predefined time period, receiving, at the control unit, measurement data from the second NOx sensor collected over the first predefined time period, determining, using the control unit, a first level of matching between the predefined waveform of the adjustment signal and the measurement data from the first NOx sensor, determining, using the control unit, a second level of matching between the measurement data from the first NOx sensor or the predefined waveform of the adjustment signal and the measurement data from the second NOx sensor, indicating, using the control unit, the presence of an anomaly at the first NOx sensor if the first level of matching is below a first predefined threshold, and indicating, using the control unit, the presence of an anomaly at the second NOx sensor if the second level of matching is below a second predefined threshold.

2. The method according to claim 1, wherein the predefined waveform is selected to be sinusoidally or rectangularly shaped.

3. The method according to claim 1, wherein the determination of the second level of matching is only performed if the first level of matching is above the first predefined threshold.

4. The method according to claim 1, further comprising: indicating, using the control unit, the presence of an ammonia (NH3) slip if the measurement data from the second NOx sensor is phase shifted as compared to the measurement data from the first NOx sensor.

5. The method according to claim 1, wherein the adjustment signal is arranged to manipulate at least one of an EGR valve, a waste gate valve position, an intake throttle valve position, a fuel injection pressure, a fuel injection timing, a variable geometry turbine (VGT) position and an ignition timing.

6. An engine system, comprising:
an internal combustion engine (ICE),
an exhaust gas aftertreatment system (EATS) coupled downstream of the ICE, the EATS comprising a selective catalytic reduction (SCR) arrangement,
a first nitrogen oxide (NOx) sensor arranged upstream of the SCR arrangement,
a second nitrogen oxide (NOx) sensor arranged downstream of the SCR arrangement, and
a control unit,
wherein the control unit is arranged to:
select a first set of control parameters to operate the ICE to generate a first output,
form a second set of control parameters to operate the ICE by manipulating the first set of control parameters with an adjustment signal having a predefined waveform, the adjustment signal adapted to vary an amount of NOx produced by the engine,
operate the ICE according to the second set of control parameters,
receive measurement data from the first NOx sensor collected over a first predefined time period, receive measurement data from the second NOx sensor collected over the first predefined time period, determine a first level of matching between the predefined waveform of the adjustment signal and the measurement data from the first NOx sensor, determine a second level of matching between the measurement data from the first NOx sensor or the predefined waveform of the adjustment signal and the measurement data from the second NOx sensor, indicate the presence of an anomaly at the first NOx sensor if the first level of matching is below a first predefined threshold, and indicate the presence of an anomaly at the second NOx sensor if the second level of matching is below a second predefined threshold.

7. The engine system according to claim 6, wherein the predefined waveform is selected to be sinusoidally or rectangularly shaped.

8. The engine system according to claim 6, wherein the determination of the second level of matching is only performed if the first level of matching is above the first predefined threshold.

9. The engine system according to claim 6, wherein the control unit is further adapted to: indicate the presence of an ammonia (NH3) slip if the measurement data from the second NOx sensor is phase shifted as compared to the measurement data from the first NOx sensor.

10. The engine system according to claim 6, wherein the adjustment signal is arranged to manipulate at least one of an EGR valve, a waste gate valve position, an intake throttle valve position, a fuel injection pressure, a fuel injection timing, a variable geometry turbine (VGT) position and an ignition timing.

11. A vehicle, comprising an engine system according to claim 6.

12. The vehicle according to claim 11, wherein the vehicle is at least one of a truck and a working machine.

13. A computer program product comprising a non-transitory computer readable medium having stored thereon computer program means for controlling an engine system, the engine system comprising:
an internal combustion engine (ICE),
an exhaust gas aftertreatment system (EATS) coupled downstream of the ICE, the EATS comprising a selective catalytic reduction (SCR) arrangement,
a first nitrogen oxide (NOx) sensor,
a second nitrogen oxide (NOx) sensor arranged downstream of the SCR arrangement, and
a control unit,
wherein the computer program product comprises:
code for selecting, at the control unit, a first set of control parameters to operate the ICE to generate a first output,
code for forming, at the control unit, a second set of control parameters to operate the ICE by manipulating the first set of control parameters with an adjustment signal having a predefined waveform, the adjustment signal adapted to vary an amount of NOx produced by the engine,
code for operating, using the control unit, the ICE according to the second set of control parameters,
code for receiving, at the control unit, measurement data from the first NOx sensor collected over a first predefined time period,
code for receiving, at the control unit, measurement data from the second NOx sensor collected over the first predefined time period, code for determining, using the control unit, a first level of matching between the predefined waveform of the adjustment signal and the measurement data from the first NOx sensor,
code for determining, using the control unit, a second level of matching between the measurement data from the first NOx sensor or the predefined waveform of the adjustment signal and the measurement data from the second NOx sensor,
code for indicating, using the control unit, the presence of an anomaly at the first NOx sensor if the first level of matching is below a first predefined threshold, and
code for indicating, using the control unit, the presence of an anomaly at the second NOx sensor if the second level of matching is below a second predefined threshold.

* * * * *